US007672972B1

(12) United States Patent       (10) Patent No.:     US 7,672,972 B1
Marjadi et al.                   (45) Date of Patent:      Mar. 2, 2010

(54) DIGITAL CONTENT LICENSING METHOD INVOLVING APPLICATION SERVICE PROVIDER

(75) Inventors: Dhiren K. Marjadi, Bloomfield Hills, MI (US); James R. Scapa, West Bloomfield, MI (US); James E. Brancheau, Dearborn, MI (US); James P. Dagg, Wixom, MI (US)

(73) Assignee: Altair Engineering, Inc., Troy, MI (US)

( * ) Notice: Subject to any disclaimer, the term of this patent is extended or adjusted under 35 U.S.C. 154(b) by 1840 days.

(21) Appl. No.: 09/855,317

(22) Filed: May 15, 2001

(51) Int. Cl.
*G06Q 30/00* (2006.01)
(52) U.S. Cl. ...................... 707/104.1; 705/59
(58) Field of Classification Search .............. 705/51, 705/59; 709/229, 219, 223, 224
See application file for complete search history.

(56) References Cited

U.S. PATENT DOCUMENTS

| 4,937,863 | A | * | 6/1990 | Robert et al. | 710/200 |
| 5,390,297 | A | * | 2/1995 | Barber et al. | 713/201 |
| 5,579,222 | A | * | 11/1996 | Bains et al. | 717/167 |
| 5,671,412 | A | * | 9/1997 | Christiano | 707/104.1 |
| 5,745,879 | A | * | 4/1998 | Wyman | 705/1 |
| 6,009,401 | A | * | 12/1999 | Horstmann | 705/1 |
| 6,411,941 | B1 | * | 6/2002 | Mullor et al. | 705/59 |
| 6,502,124 | B1 | * | 12/2002 | Shimakawa et al. | 709/203 |
| 6,574,612 | B1 | * | 6/2003 | Baratti et al. | 705/59 |
| 6,728,766 | B2 | * | 4/2004 | Cox et al. | 709/220 |
| 6,732,106 | B2 | * | 5/2004 | Okamoto et al. | 707/100 |
| 6,816,882 | B1 | * | 11/2004 | Conner et al. | 709/203 |
| 2002/0049679 | A1 | * | 4/2002 | Russell et al. | 705/52 |

\* cited by examiner

*Primary Examiner*—Evens J Augustin
(74) *Attorney, Agent, or Firm*—Young Basile

(57) ABSTRACT

A predetermined number of assigned units for each of a plurality of individually selectable pieces of digital content are checked when each piece of digital content is executed in a customer computer network or on an application service provider. Execution of a requested digital content is granted when the number of required units to execute the requested digital content is less than or equal to the total number of available units. Any licensed digital content may be executed on the separate application service provider through a communication network. Access is granted for execution of the requested digital content by a license manager based on whether the application service provider required units of the requested digital content are greater than the available units on the requesting customer computer network. Execution of the requested digital content on the application service provider may be immediate if the application service provider is available or execution can be delayed. If the requested digital content cannot be executed immediately, the required units can be locked up and charged to the customer computer network available units or left uncharged.

12 Claims, 3 Drawing Sheets

DIGITAL CONTENT LICENSING METHOD INVOLVING APPLICATION SERVICE PROVIDER

BACKGROUND

1. Field of the Invention

The present invention relates, in general, to license management programs suitable for licensing and managing the usage of digital content, such as computer software products.

2. Description of the Art

Although computer programs, individually also referred to as computer software products, can be sold to an end user, a more frequent approach is to license the software product or program to an end user, with the software vendor or owner retaining ownership of all of the rights to the computer product.

Each license is devised to control the usage of the computer product or software by stating the conditions under which the computer product may be used, such as the location of use, the number of times used, etc. Software products are licensed in many ways. By one category, licenses can be divided into node-locked licenses or network licenses. By another category, licenses can be divided into product licenses or product suite licenses. In general most licenses could be described by a combination or a simple variation thereof of the above two categories; i.e. node-locked product licenses, node-locked product suite licenses, network product licenses, and network product suite license.

Node-locked licenses restrict the use of software to a given computer. The major limitation of this approach is that it requires customers to purchase software separately for each potential user. Since each user does not use each software on his machine all the time, software purchased via this approach would idle most of the time. This is a very inefficient use of customers' money.

Network licenses allow access to the software products on computer networks formed of a number of interconnected computers or nodes which may be linked to each other and/or a central host. This addresses the primary inefficiency of node-locked licenses. The customer must now purchase licenses only to cover the anticipated number of peak simultaneous users of that software.

Product licensing restricts the use of the license to only the product for which it is valid. In other words, the license is not transferable to other products. The limitation of this approach is that a customer must purchase the peak licenses, either node-locked or network, for each product separately. Again, peak usage for different products do not occur at the same time. Hence, the customer ends up purchasing more software licenses than really required.

Product suite licenses allow access to several software products using common licenses. A suite would generally include several individual programs which may be run concurrently with each other or individually and may or may not be linked to other programs in the suite. Traditional licensing approaches for computer programs or suites typically involve one license for all of the programs in each entire suite such that a user on a node of a computer network is charged with one license use regardless of which program the user is running from a particular program suite. A major limitation of this approach is that it assumes that each product in the suite has an equal value. Also, product suites typically involve a small number of software products which complement each other, and the expansion of suite licensing to license a wide range of software products is commercially impractical.

A recent development in licensing has been the units based licensing of multiple products. In such a system, different products are assigned different values in terms of units. A customer would license a certain number of units to run any and all of these products. While on paper, this system appears to address limitations listed above, in reality it does not due to the manner in which it is implemented by several organizations. Under this setup, when a user runs multiple products, the user is charged multiple units, also called stacking of units. Since the customers have limited budgets for purchasing software products, this system (i) forces the users to terminate one product in order to run another, thus decreasing the user's efficiency, or (ii) forces the customer to purchase additional licenses with no additional value thus undermining the profitability of their organization. This system does not encourage users to try new products, even though they are accessible and available on their network.

Although existing software or electronic media licensing systems allow or deny access to a requesting user to execute or run an electronic media or software program on a computer or computer network, frequently the computer or computer network does not have sufficient capacity to immediately run the program, software or electronic media. Normally, a small capacity processor would be completely adequate in instances where there are a small number of users requesting access to the processor or such access is requested infrequently. However, it may become necessary to expand the memory or disk space, or to increase the processor speed, to name a few factors, when more users are added to the network, where the computer products or applications are run more frequently, where the size of an application goes up, etc. For example, a few years ago, a full vehicle model consisted of approximately 100,000 discrete points. Currently, vehicle models contain 500,000 discrete points and are heading towards 1,000,000 discrete points thereby increasing by an order of magnitude the application size.

Cost factors may dictate that a particular computer or computer network owner would not always wish to immediately expand the capacity or speed of its computer or computer network. This is particularly the case where there may be short lived bursts in application execution or user access which are not expected to occur in the future. Another factor is that the dynamic consumer electronic medium industry in which current technology is updated or obsolete in a matter of months. A particular consumer would prefer not to install and un-install software products on his/her computer on a recurring basis. Rather, the consumer would prefer to just use the software. Further, new versions of software products or digital media come out very frequently. Bug fixes and patches are delivered almost on a continual basis. A consumer or digital content user does not always receive or install fixes or patches. Further, a business consumer may not wish to maintain a computer server and employ information technology people to manage it. A business consumer may also wish to provide a customer with the choice of products for a set budget. A business consumer may further wish to provide a customer with the flexibility to transfer licenses from one product to another. While application service providers' processors have been used at a remote location to temporarily run an application program which cannot be run on an existing computer or computer network due to over capacity, etc., licensing approaches have not extended to cover such remote application service provider execution.

Thus, it would be desirable to provide a licensing management method for licensing digital content which overcomes the limitations of previous licensing approaches. It would also be desirable to provide a licensing management method which provides a user with the choice of executing or running digital content on its own computer and/or on a remote application service provider processor.

SUMMARY OF THE INVENTION

The present invention is a method for licensing digital content in the form of individual computer programs and/or other electronic or digital media in which the digital content is executed, at a customer's choice, either on the customer's computer network or on an application service provider processor, or on both.

The licensing method is usable with one or more customer computer networks, each including at least one node capable of executing digital content obtained from a program source on each network, and on a separate application service provider through a communication network. The licensing method includes the steps of:

a. providing licensed units on a customer computer network;

b. providing independently selectable digital content;

c. assigning a predetermined number of customer computer network assigned units to each independently selected digital content when the digital content is run on the customer computer network;

d. assigning a predetermined number of application service provider assigned units to each independently selected digital content when the digital content is run on the application service provider;

e. charging a number of checked out units to the customer computer network based on the digital content currently being run by the customer on the customer computer network and the application service provider computer network;

f. determining a number of available units equal to the difference between the total licensed units to the customer computer network and the total checked out units charged to the customer computer network; and g. determining whether a requested digital content is to be executed or denied execution on at least one of the customer computer network and the application service provider network based on the available units on the customer computer network requesting execution of the digital content and the total checked out units charged to the customer computer network.

The method also includes the steps of:

when the available units on the customer computer network requesting execution of a digital content are greater than or equal to the application service provider required units of the digital content requested by the customer computer network, determining when the application service provider required units of the requested digital content to be executed on the application service provider are to be charged to the available units, and then charging the application service provider required units of the requested digital content to the available units of the customer computer network requesting the digital content at the determined time or event occurrence.

In one aspect, the number of application service provider assigned units of each digital content executed on the application service provider may differ from the number of customer computer network assigned units of the same digital content when executed on the customer computer network.

In another aspect, upon termination of an execution of one digital content on the customer computer network or on the application service provider, the units of the terminated digital content are returned as customer computer network or application service provider returned units to the available units of the customer computer network to compute the new available units.

The product suite licensing method of the present invention uniquely extends a license management system to application service providers which are coupled through a data communication network, such as the World Wide Web, to one or more computer networks, each having at least one node accessing a product suite of digital content carried on the customer computer network and typically controlled by a separate licensing management program. The present method provides the user of a computer network with the flexibility to determine where a particular licensed digital content is to be executed. This further enables a user to structure its computer network in the most favorable manner to the user with only the capacity to run the normal number of programs; while relying on the application service provider for additional computing capacity during peak execution times. In addition, the present licensing method enables a user to rely on the application service provider for all of its computing capacity during peak or even non-peak usage times. The licensing method easily accommodates and enables a customer to execute all or part of a particular digital content product on a remote application server to cover peak usage on the customer's network or to substitute a particular customer's local network with 100% execution of digital content on a remote application server. Further, the license arrangement accommodates the execution of the digital content product partially on the customer computer network and partially on the application service provider.

This license method enables the user of a computer network to have access to the most current versions of any software program as well as the ability to execute software programs on high speed, high capacity processors. Present licensing arrangement also eliminates the customer's inconvenience of managing the installation and un-installation of software to implement software upgrades, bug fixes, etc.

The licensing method of the present invention lends itself to easy adaptability to changes in the dynamic electronics industry by minimizing the efforts on the part of a licensee in installing and un-installing new digital content, bug fixes, patches, etc., on its computer thereby enabling the customer to have easy access to the latest versions of all digital content. The licensing method of the present invention also enables a business customer to eliminate the need to maintain a computer server and employ information technology people to manage it. The licensing method of the present invention further provides a customer with the ability to choose a number of different digital content or products for a set budget as well as the ability to easily transfer licenses from one digital content product to another.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
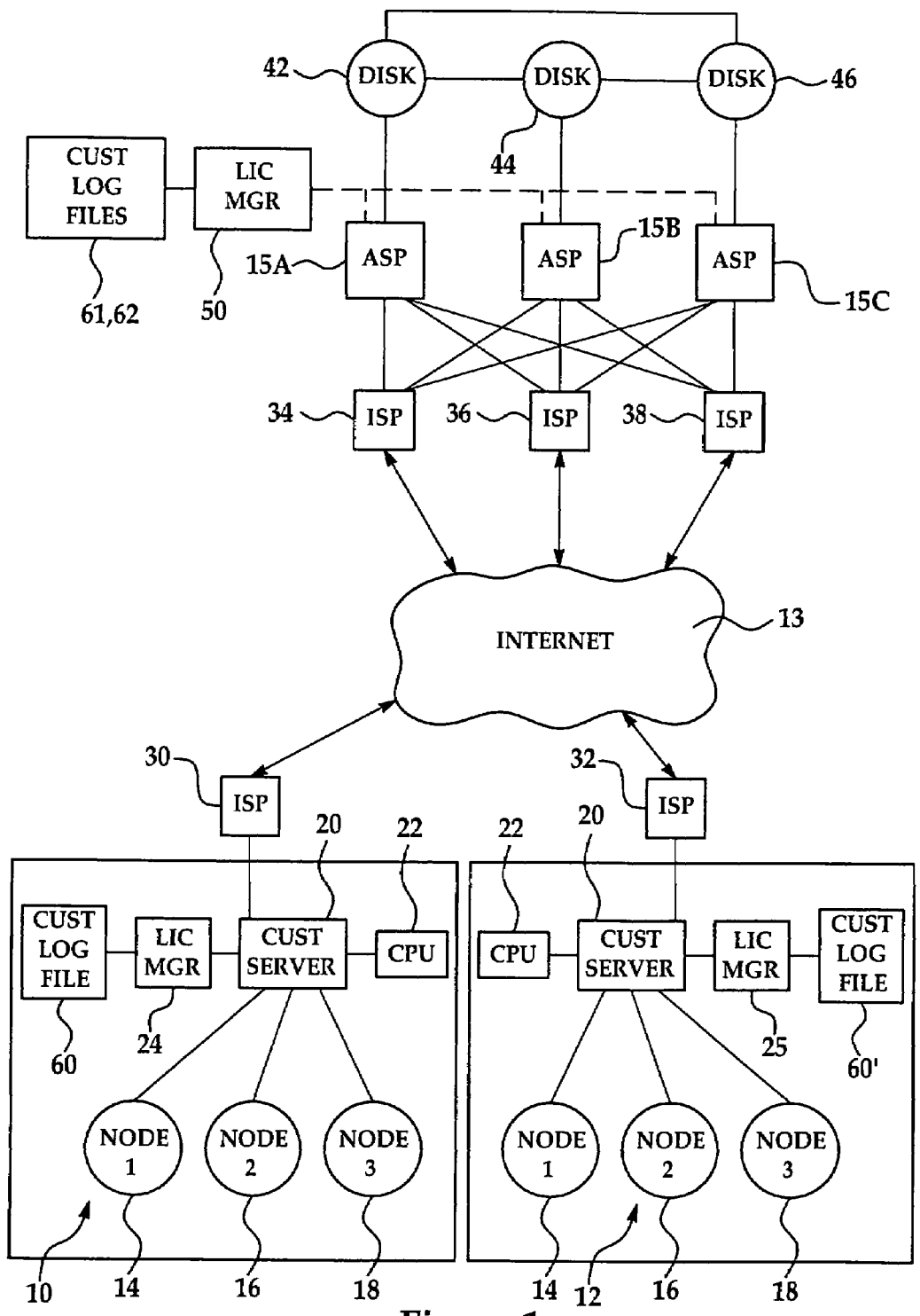
FIG. 1 is a pictorial representation of a communication network coupled to a computer server and application service provider which uses a licensing management method of the present invention.

Referring now to the drawings and to FIG. 1 in particular, there is depicted a computer communications network containing at least one customer computer network 10 and, preferably, a plurality of customer computer networks 10, 12, etc. which can independently communicate through a communications network 13, such as the Internet, with one or more remotely located application service provider (ASP) networks 15A, 15B, 15C.

By way of example only, the customer computer networks 10 and 12 each include at least one and, optionally a plurality of individual nodes, with three nodes 14, 16, and 18, being depicted by way of example only in networks 10 or 12. Each of the nodes 14, 16, and 18 is connected to a network server 20 and has its own network address so that any one of the nodes 14, 16 and 18 can communicate with the other nodes 14, 16, and 18 within the network 10 or 12. The network server 20 is connected in data communication with a host CPU 22.

Although the individual nodes 14, 16, and 18 are depicted as being connected in a spoke configuration to the network server 20, it will be understood that this arrangement is by example only as the individual nodes 14, 16, and 18 may be connected in a ring configuration or any other configuration found in computer networks. Further, the network server 20 and the host CPU 22 may be combined into a single computer.

As will be clearly understood by those in the computer art, each of the nodes 14, 16, and 18, as well as the network server 20 and the host CPU 22, may be formed of a conventional central processing unit, such as a microprocessor, as well as standard computer components coupled to the CPU, including a memory, input components, such as a keyboard, etc., and output components, such as a screen display, printer, etc., not shown.

For explanatory purposes only, a node is defined as a unique combination of a user, or a CPU or host, or a display, or a user and a CPU, or a CPU and a display, or a user and a display, or a user, a CPU and a display.

A license manager 24 is embodied in a software program which may be resident or stored in the memory of the network server 20 or the host CPU 22 and/or capable of being stored in a storage media, such as a disk, CD-ROM, etc. The license manager 24 may also be resident or stored in the memory of a separate central processing unit or microprocessor which is coupled to the network server 20 or the host CPU 22.

The function of the license manager 24, as described in greater detail hereafter, is to control access to as well as monitor the execution or running of one or more pieces of individual digital content or media coupled together or sold as a suite or even sold or licensed individually. The suite is formed of a plurality of individual digital content which may be separately executable or executable in multiple numbers, and is resident in the memory of and/or a hard drive connected to the host CPU 22. In this arrangement, the network server 20 merely distributes an authorized licensed program from the suite to the requesting node.

The term "digital content" as used herein means any type of electronic or digital content or media which can be executed or run by a computer processor. Thus, "digital content" includes computer software in the form of application programs, operating systems, etc., as well as digital content for audio, video, audio/video executable files. Further, the term "digital content" as used with the present licensing method further includes digital data or digital files which can be processed by other application programs or require execution by other software and/or hardware, such as a music player, etc.

Before defining the details of the inventive licensing method of the present invention, definitions of key terms will first be presented.

Licensed Units: The total number of units licensed by a customer on a customer computer network.

Customer Computer Network (CCN) Assigned Units: The value in terms of units assigned to each discrete digital content in the product suite licensed by one customer for execution on the customer computer network.

Application Service Provider (ASP) Assigned Units: The value in terms of units assigned to each discrete digital content in the product suite licensed by one customer for execution on an application service provider.

Customer Computer Network (CCN) Node Running Total: The total number of units checked out by one node on the customer computer network at a given time. In a leveling licensing arrangement on the customer computer network, the CCN node running total is equal to the product or digital content having the highest CCN assigned units value of all of the products or digital content executed by the one CCN node at one given time. In a stacking licensing arrangement, the CCN node running total is equal to the total of the CCN assigned units of all of the products or digital content executed by the one CCN node on the customer computer network.

Application Service Provider (ASP) Node Running Total: The total number of units checked out by one ASP node on the application service provider at a given time. In a leveling licensing arrangement on the application service provider the ASP node running total is equal to the product or digital content having the highest ASP assigned units value of all of the products or digital content executed or locked for later execution by the one node at one given time. In a stacking licensing arrangement, the ASP node running total is equal to the total of the ASP assigned units of all of the products or digital content executed or locked for later execution by the one node on the ASP computer network.

Customer Computer Network (CCN) Checked Out Units: The sum of node running totals of all nodes on the customer computer network.

Application Service Provider (ASP) Checked Out Units: The sum of node running totals of all nodes on the application service provider for one customer.

Total Checked Out Units: The sum of the CCN checked out units and the ASP checked out units.

Available Units: Licensed units minus total checked out units.

Customer Computer Network (CCN) Required Units: Number of units required to start a new product or digital content run by one node on one customer computer network. In a leveling licensing arrangement, if the CCN assigned units for the new product or digital content are greater than the CCN node running total, the CCN required units equals the CCN assigned units of the new product minus the CCN node running total. If the CCN assigned units for the new product or digital content are less than or equal to the CCN node running total, then the CCN required units equals zero. In a stacking licensing arrangement, the CCN required units equals the number of CCN assigned units for the new product or digital content.

Application Service Provider (ASP) Required Units: Number of units required to start a new product or digital content run by one node on an application service provider. In a leveling licensing arrangement, if the ASP assigned units for the new product or digital content are greater than the ASP node running total, the ASP required units equals the ASP assigned units of the new product minus the ASP node running total. If the ASP assigned units for the new product or digital content are less than or equal to the ASP node running total, then the ASP required units equals zero. In a stacking licensing arrangement, the ASP Required Units are the number of ASP assigned units for the new product or digital content.

Customer Computer Network (CCN) Returned Units: Number of units returned to the available units when a product or digital content is terminated by one node on the customer computer network. In a leveling licensing arrangement, if the CCN assigned units of the terminated product or digital content are less than the CCN node running total, then the CCN returned units equals zero. If the CCN assigned units for the terminated product are equal to the CCN node running total, then the CCN returned units equals the CCN assigned units for the terminated product minus the next highest CCN assigned units value of the remaining products or digital content running on the node. In a stacking licensing arrangement, the CCN returned units equals the CCN assigned units of the content terminated on the customer computer network.

Application Service Provider (ASP) Returned Units: Number of units returned to the available units when a product or digital content is terminated by one node on the application service provider. In a leveling licensing arrangement, if the ASP assigned units of the terminated product or digital content are less than the ASP node running total, then the ASP returned units equals zero. If the ASP assigned units for the terminated product are equal to the ASP node running total, then the ASP returned units equals the ASP assigned units for the terminated product minus the next highest ASP assigned units value of the remaining products or digital content running on the node. In a stacking licensing arrangement, the ASP returned units equals the ASP assigned units of the content terminated on the application service provider.

Each piece of digital content in a program suite licensed to a particular customer computer network, such as customer computer network 10 and 12, is provided with two separate assigned units, such as the CCN assigned units and the ASP assigned units defined above. The actual number of assigned units assigned to each discrete digital content in the program suite can be arbitrarily chosen, and the number of assigned units for two or more pieces of digital content can be identical or different.

By way of example only, the number of assigned units assigned to each piece of digital content is selected as a function of one license price of each product or program divided by an arbitrary factor. By example only, the lease price of each discrete digital content or digital product is divided by $250 to yield the number of assigned units assigned to each piece of digital content. It will also be understood that the number of assigned units assigned to each digital content may also be based on the size of the individual products, the amount of time typically employed to run each digital content, or its inherent value to an end user in a particular application.

The above described assigning of units for each piece of digital content in the program suite can be further understood by referring to U.S. patent application Ser. No. 09/553,115 filed Apr. 13, 2000, and entitled PRODUCT SUITE LICENSING METHOD, the entire contents of which are incorporated herein by reference. This prior application describes a licensing method based on a unique leveling concept for controlling the licensing of products for digital content in a product suite in a single customer computer network.

It will be understood that the present digital content licensing method is directed toward the execution of licensed digital content on the customer's own computer network and/or on an application service provider at the selection of a customer. Thus, the customer has the option of:

1. running all licensed digital content on its own computer network;
2. running some digital content on its own computer network and some digital content on the ASP network;
3. running a portion of one piece of digital content on its own computer network and a portion of the same piece of digital content on the ASP network; or
4. running all licensed digital content on the ASP network.

Thus, the present licensing method requires input from the license manager 24 of the customer computer network 10 to determine the customer computer network checked out units of digital content currently being executed by the customer on the customer computer network 10 in conjunction with ASP checked out units for digital content currently being executed on the application service provider 15A, 15B, or 15C for the customer computer network 10.

The ASP assigned units for each piece of digital content in the product suite licensed to the customer computer network 10 can be the same as the CCN assigned units for the same piece of digital content when the digital content is executed on the customer computer network 10. However, preferably, the ASP assigned units for each piece of digital content which is executable at the selection of a customer on the customer computer network 10 or 12 or on a remote application service provider 15A, etc., is different than the CCN assigned units for the same piece of digital content.

The ASP assigned units for each individual product in the product suite may be calculated or preset according to any one of a number of different methods:

1. A fixed percentage difference of the CCN assigned units of each product at each individual customer, such as a fifty percent surcharge of each of the CCN assigned units of the products in the product suite.
2. A variable percentage difference of the CCN assigned unit value of each product in the product suite which is selected according to any one of a number of different criteria, including, for example, frequency of usage, individual product costs, product length in terms of required memory, storage, special processing factors, etc.
3. A flat difference of a fixed number of units, such as sixty units, in addition to the CCN assigned units for each product in the product suite.
4. A different flat rate for each individual product based on any one or more of various criteria including frequency of use, perceived value to the customer, product cost, etc.

The number of ASP assigned units may also be variable on a time of day or time of week basis, with the ASP assigned units for digital content which are executable during selected periods of the day or week in which the ASP 15A, etc., normally is underutilized, such as during the night, or on weekends, for example, can be different than the ASP assigned units for the same piece of digital content when executed during normal business hours during the week.

It will also be understood that the ASP assigned units, calculated according to any one of the above methods, may also be implemented in a license strategy in different ways, including the previously described leveling approach, a simple stacking approach, or combinations thereof.

In a leveling approach, for example, the ASP required units for execution of a requested product from the product suite by one of the nodes on the customer computer network 10 will be treated the same as when the individual node requests access to one of the products in the product suite stored on the customer server 20 except that the ASP assigned units will be one of the above described ASP assigned units. Calculation of the ASP required units for the requesting node will be according to the leveling method described in the pending application Ser. No. 09/553,115 filed Apr. 13, 2000, and entitled PRODUCT SUITE LICENSING METHOD, and will be used to determine access or denial of access to the requested program on the ASP 15A, etc.

In a stacking approach, for example, the ASP required units for execution of a requested product from the product suite by one of the nodes on the customer computer network 10 will be treated the same as when the individual node requests access to one of the products in product suite stored on the customer server 20 except that the ASP assigned units will be one of the above described ASP assigned units. Calculation of the ASP required units for the requesting node will be according to the stacking method described in the above-referenced US patent application and will be used to determine access or denial of access to the requested program on the ASP 15A, etc.

It should be noted that the present digital content licensing method makes use of the available number of units on the customer computer network 10 in determining whether or not a particular piece of digital content selected by the customer computer network 10 is to be executed on the application service provider 15A, 15B, etc. Thus, the specific licensing method deployed by license manager 24 on the customer computer network 10 can be any suitable licensing arrangement, such as a conventional stacking license arrangement, a leveling licensing arrangement as in the above-referenced application, combinations thereof, etc.

Each customer computer network 10 or 12 communicates with the data communication network 13 through an Internet service provider or ISP 30, 32, respectively. In addition, the data communication network or Internet 13 in the present invention communicates with one or more application service providers 15A, 15B, 15C through Internet service providers 34, 36 and 38, respectively. Although a single ISP 34 and a single ASP 15A may be employed for communicating with one or more customer computer networks 10 and 12, for further flexibility and to insure a faster response time and an execution or run of individual digital content on the application service provider for any of the customer computer networks 10 or 12, the plurality of ISPs 34, 36 and 38 are each connectable to one or more ASPs 15A, 15B, 15C. Each ASP 15A, 15B and 15C may also be connected to memory storage media, such as one or more disks 42, 44 and 46. Each ASP 15A, 15B and 15C can access each of the disks, 42, 44 and 46 to obtain data or digital content stored on the disks 42, 44, and 46.

An ASP license manager 50 according to the present invention is connected to each of the ASPs 15A, 15B and 15C. Initially, the customer computer network license manager 24 recognizes the total number of licensed units purchased or made available in the customer server 20. This total number of licensed units can be paid in any of a number of ways, each primarily based on a license term or period, such as one year, for example only. The license royalty or fee will be based on a certain price per license unit, such as $250 per license unit in the above example. However, the number of licensed units purchased by this license fee covers the complete license term, such as one year, for example, and acts as a cap limiting the number of individual programs or products, as described hereafter, which can be executed or run simultaneously on the customer computer network 10 and the ASP network 15A, etc. To state this another way, the total checked out units at a given time cannot exceed the number of licensed units paid for by the licensee or entity controlling the network 10.

The licensed units which are purchased by a particular customer can come in a number of different forms. In one form, all of the licensed units are treated the same and useable both on the customer computer network 10 or 12 as well as the ASP network 15A, etc. In this manner, the customer may execute digital content on either its own customer computer network 10 or the ASP 15A, 15B, etc., and use the licensed units for either network. Second, the licensed units may be in two varieties, namely, customer computer network licensed units and ASP network licensed units. This leads to several variations including the customer computer network licensed units being useable only on the customer computer network and the ASP licensed units useable only on the ASP network, or the customer licensed units being useable on both the customer computer network and the ASP computer network, but the ASP licensed units being useable only on the ASP network, or the customer licensed units being useable only on the customer computer network and the ASP licensed units being useable on both the customer computer network and the ASP network.

In addition to the same or different licensed units for execution of digital content on the customer computer network and the application service provider network 15A, 15B, etc., the present invention also contemplates the product suite of programs available on the customer computer network being the same or different from the product suite of products or digital content which is available for run or execution on the application service provider network 15A, 15B, etc. For example, the digital content available on the customer computer network may be identical to the digital content available for execution on the application service provider network. Alternately, the application service provider network may contain more or less digital content than that available to the same customer on the customer computer network. Further, the customer computer network and the ASP network may have some of the same digital content and may also each have different digital content which is executable separately on the customer computer network or the application service provider network, respectively, and not vice-versa.

A customer log file 60 is maintained by the license manager 24 for the customer computer network 10 and a customer log file 60' by the license manager 25 for the customer computer network 12. The customer log file 60 or 60' contains the total number of available units which can be used at the customer computer network 10 or 12 and/or on an application service provider 15A, etc., at any given time. The license manager 24 for the customer computer network 10 will update the customer log file 60 for each change of the available units on the customer computer network 10. As described hereafter, such a change in the available units on the customer computer network 10 results from the execution of additional products from the program suite or the termination of the execution of one of the products in the suite either on the customer computer network 10, 12, or on the ASP computer network 15A, 15B, etc.

Figure 2:
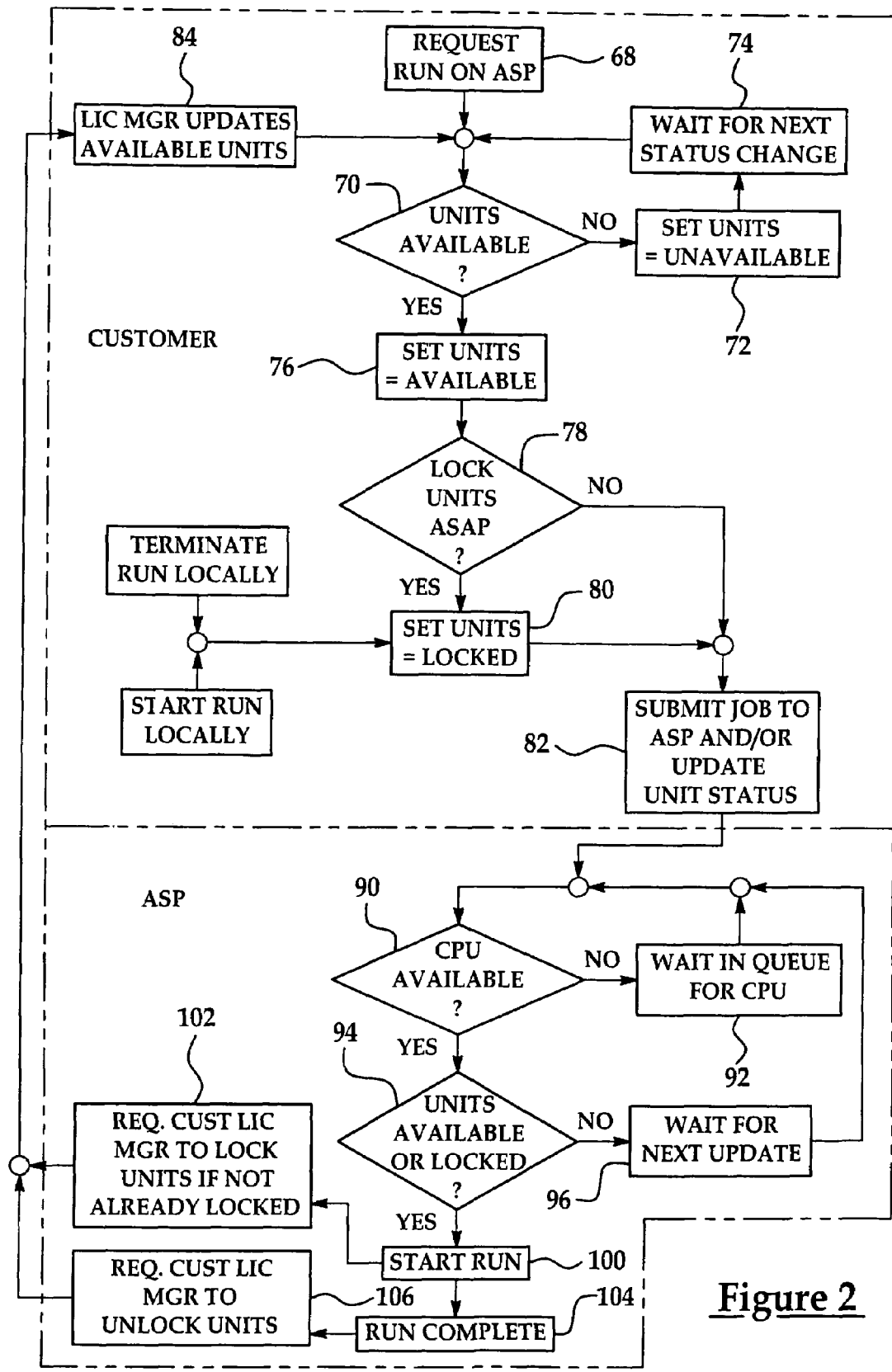
FIG. 2 is a flow diagram depicting the operation of the license management method of the present invention.

A customer may execute any of the digital content on its local customer computer network 10 or 12 based on the determination by the license manager 24 or 25, respectively, whether the number of available units is sufficient to execute the next requested digital content on the respective customer computer network 10 or 12. However, for the reasons set forth above, the customer, such as the customer using the customer computer network 10, may decide to execute a piece of digital content on the ASP network, 15A, etc. As shown in FIG. 2, the customer computer network 10 initially requests a run or execution of digital content on the ASP 15A, 15B, 15C, etc., in step 68 by sending the request through its ISP 30 and the data communication network 13 to the ASP network, 15A, 15B, etc. However, before the run is initiated, the license manager 24 first determines in step 70 if a sufficient number of units is available for executing the requested digital content on the ASP network. This available unit count is obtainable from the customer log file 60 or customer log file 60' for the customer computer network 12.

If the available units in the customer log file 60, for example, are insufficient for the ASP 15A, etc., to execute the requested digital content, the license manager 24 sets a flag "units unavailable" in step 72, and the status is logged in step 82 for further processing.

However, if a sufficient number of units is available for executing the requested digital content, the license manager 24 sets a flag "units=available" in step 76 and then makes a determination in step 78 whether the user has asked to lock or not lock the units at this time. If the user has asked not to lock the units at this time, the flag remains set at "units=available", and the status is logged in step 82 for further processing. However, if the user has asked to lock the units, the license manager in step 80 sets a flag "units=locked.", and the status is logged in step 82 for further processing and asks the license manager 24 to check out the units.

The license manager in step 84 communicates the unit status logged in step 82 at regular intervals, such as every 1 minute or 15 minutes, for example, to the ASP 15A, etc., or when the status is updated in steps 72, 76 or 80 and logged in step 82.

If the status is "units=locked", the requested content will run on the ASP computer network 15A, etc. as soon as a CPU becomes available on the ASP network. However, regardless if the status is "units=available" or "units=unavailable", the status may change depending on the activities on the customer computer network 10, 12 or the ASP computer network 15A, 15B, etc. Hence, in addition to logging the status on to step 82, steps 72 and 78 also loop the control back to step 74 so that step 70 will be re-evaluated and the units status may be changed from "available" to "unavailable" or vice versa depending upon the change in availability of units in step 76, or a change in CPU status from available to unavailable, or a second or later queued content may be executed instead of the first queued request.

As shown in FIG. 2, the license manager 24 updates the available units in the customer log file 60 upon any of the following events:

1. Termination of a local run on the customer computer network 10;
2. The setting of "units=locked" flag in step 80;
3. The start of an execution or run of a piece of digital content on the customer computer network 10;
4. A request from an ASP 15A, 15B, etc., to lock units if not already locked; and
5. A request from one of the ASP 15A, 15B, etc. to release units at the termination of a run or execution of a piece of digital content on the ASP 15A, 15B, etc.

Thus, it can be seen that the number of available units in the customer log file 60 can be a dynamically changing number dependent upon execution of digital content on the customer computer network 10 and a choice by the customer computer network 10 to execute pieces of digital content on the ASP 15A, 15B, etc. The execution, locking or unlocking of units and the termination of execution of any piece of digital content on the customer computer network 10 or the ASP network, 15A, 15B, etc., causes the number of available units to increase or decrease accordingly.

Referring back to FIG. 2, after step 82 is completed, control now transfers to the license manager 50 for the ASP network 15A, 15B, etc., for step 90. The license manager 50 makes a determination in step 90 if an ASP CPU is available to execute the requested digital content. If a CPU is unavailable, the run request is controlled by the ASP license manager 50 and is a sequential ordering of digital content awaiting an available CPU on the ASP network, 15A, 15B, etc.

If a CPU is available as determined in step 90, the license manager 50 makes a determination in step 94 if the units status is "locked", "available" or "unavailable". If the status is "unavailable", step 96 is executed wherein the license manager 50 waits for the next unit status update in steps 82 and 84 from the customer computer network 10, or the license manager 50 regarding the status of CPUs.

If the status was "available" or "locked", the ASP network 15A, 15B, etc., starts the execution in step 100. Simultaneously, the ASP network 15A, 15B, etc., requests in step 102 the customer license manager 24 to lock the units required to execute the requested piece of digital content if not already locked in step 80. This causes the license manager 24 to readjust the available units in the customer log file 60.

Next, upon the completion of the run or execution of the digital content in step 104, the ASP 15A, etc. in step 106, requests the customer license manager 24 to unlock the units according to which digital content is terminated. This request is honored by the license manager 24 which adds the units in the customer log file 60 to reflect the terminated digital content on the ASP 15A, etc. The completion of the run or execution of the digital content in step 104 also updates the status of available CPUs, thus triggering the decision process for choosing the next job for execution.

The license manager 50 controls and monitors all jobs queued, whether due to unavailability of a CPU or due to the unavailability of units, as follows. When a CPU becomes available due to termination of a job in step 104, the license manager 50 would check the first job in the queue for its units status in step 94. If units are "available" or "locked", that job will be executed as described earlier. If units were "unavailable", the job will be returned back to the queue and marked as "returned". The license manager will now check the next job in the queue for its units status. It will continue to check jobs in the queue until it finds a job with units status of "locked" or "available", or there are no more jobs left to check in the queue. The license manager 50 may also be designed such that a "returned" job would retain its original position, or it is sent to the bottom of the queue, or it is demoted by a certain number of spots in the queue. Also, if a job is flagged "returned" a certain number of times, say 3 times for example, and is waiting in the queue for a certain number of hours, say 6 hours for example, the license manager may be designed to delete the job from the queue altogether.

Another situation may arise using the communication network, customer computer network and application service provider network shown in FIG. 1. For example, if one of the users on the customer computer network 10 desires to work at home or at another location remote from the location of the customer computer network 10 or the location of one of the nodes 14, 16 and 18, the user removes a selectable number of units, referred to as "customer computer network remote units" and "ASP network remote units", from the available units on the customer computer network 10 and the ASP network 15A, etc. The customer computer network remote units are the number of licensed units which are available to the disconnected user at the remote location to execute digital content licensed to the customer or otherwise copied to or made available to the disconnected user. The ASP remote units are the number of licensed units available to the disconnected user at the remote location to execute digital content licensed to the customer on the ASP network 15A, 15B, etc.

A license manager, such as license manager 60, is copied as a remote license manger for the disconnected user to control licensing of the remote unit by the user on his own computer which then appears to act as a totally disengaged or separate terminal from the nodes 14, 16 and 18 in the customer computer network 10 in FIG. 1. Licensing by the disconnected user can be either via stacking, leveling or combinations thereof as described above. It should be noted that checking out of a certain number of remote units by the disconnected user will reduce the total number of available units for the other users on the customer computer network 10.

The remote or disconnected user may also wish to execute some or all of the digital content in the program suite which the user has taken from the customer computer network 10 on the application service provider computer network 15A, 15B, etc. During the initial disconnection of the user from the customer computer network 10, a flag will be provided for the disconnected user of its relationship to the customer computer network 10. In this manner, when the disconnected user sends an inquiry to the ASP 11A, 15B, etc. for execution of digital content on the ASP computer network, the ASP license manager 50 will recognize the parent/child relationship between the disconnected user and the customer computer network 10.

According to the present invention, all inquiries and/or interaction between the disconnected user and the ASP network 15A, etc., will be handled in the same manner as described above and shown in FIG. 3 as if the disconnected user were still connected to the customer computer network 10. That is, the disconnected user will be subject to the available units for the customer computer network 10 when requesting the execution of digital content on the ASP network.

Figure 3:
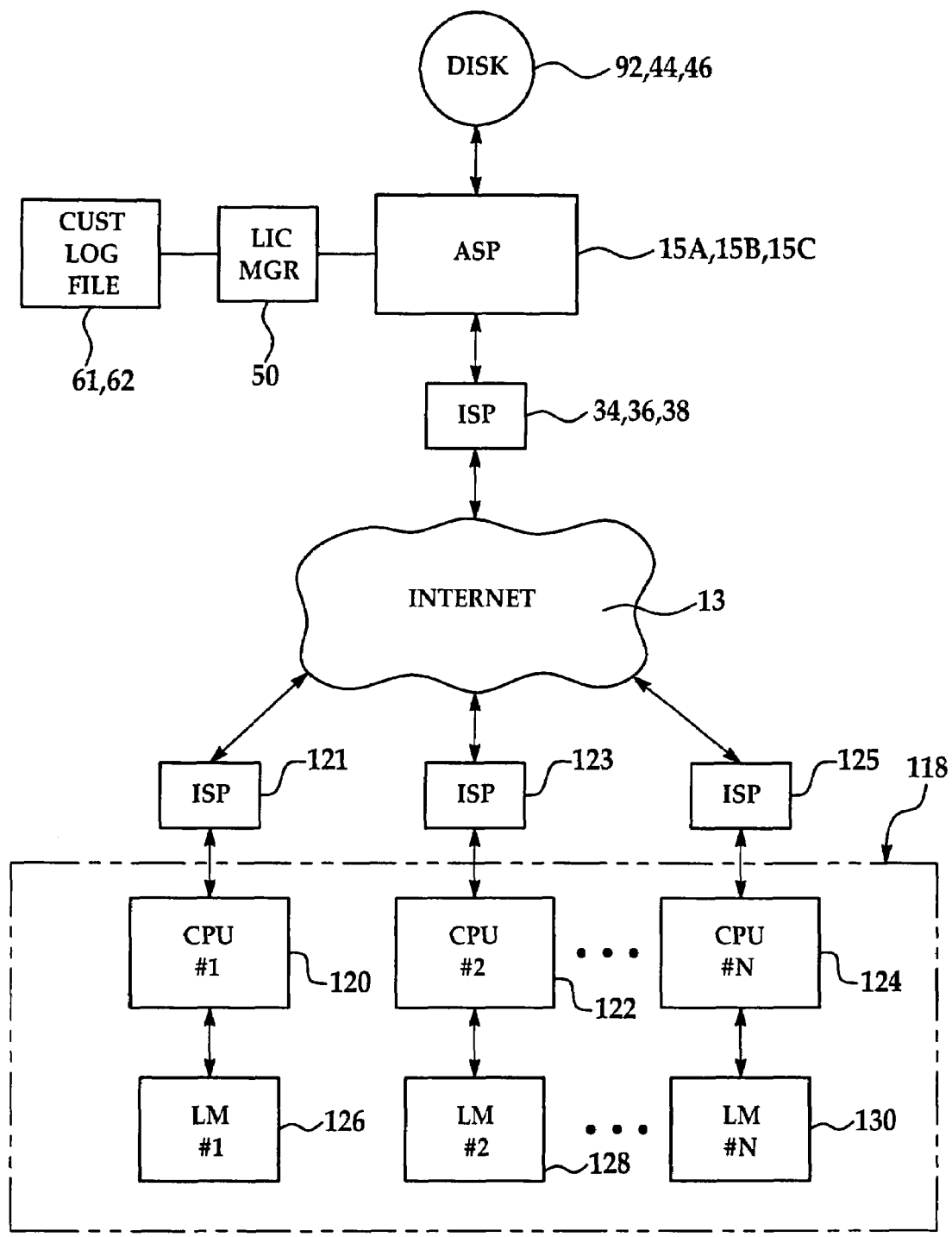
FIG. 3 is a pictorial representation of an alternate computer server and application service provider communication network using a licensing management method according to the present invention.

Referring now to FIG. 3, there is depicted a similar arrangement of a customer computer network denoted here by reference number 118 which communicates through a global telecommunication network, such as the Internet 13, to an application service provider or ASP 15A, 15B, 15C, etc., in the same manner as described above and shown in FIGS. 1 and 2.

However, in this arrangement, the single customer computer network 118 is formed of a number of individual CPUs 120, 122 and 124, for example only. Each CPU 120, 122 and 124 has its own individual license manager 126, 128 and 130, respectively. Each CPU 120, 122 and 124 also has access to the ASP network 15A, 15B and 15C through the Internet 13 via individual Internet service providers or ISPs 121, 123 and 125, respectively.

The individual CPUs 120, 122 and 124 may constitute three different users not normally affiliated with a business customer computer network. These users act independently and may be in different physical locations without any direct connection between the CPUs 120, 122 and 124. The users of the CPUs 120, 122 and 124 will initially join together as a group forming the customer computer network 118 by purchasing a total number of licensed units as a group. The individual license managers 126, 128 and 130 have access to each other via the Internet 13 to maintain a total number of individual checked out units and available units for each CPU 120, 122 and 124. Each license manager 126, 128 and 130 also communicates with the ASP license manager 50 for execution of the communication and control routine described above and shown in FIG. 2. The ASP license manager 50 sends updates to each license manager 126, 128 and 130 on the customer computer network 118 to provide each of the license managers 126, 128 and 130 associated with the CPUs 120, 122 and 124, respectively, with requests for locking and unlocking units.

The arrangement shown in FIG. 3 enables a number of what would normally be independent CPUs to have access to an application service provider to run the latest digital content of any type, such as application programs, video games, etc., without purchasing the actual software or video game. Each individual customer is restricted by acting as a group in terms of abiding by the number of available units before being able to access and execute digital content on the ASP network; but typically obtains access to a larger number of units than purchased individually by the customer, and consequently to larger quantities of digital content than each customer's individually purchased units would allow.

In summary, there has been disclosed a unique licensing method which overcomes deficiencies encountered in previous licensing arrangements involving the execution of digital content, either individually or as selected from a product suite containing a number of licensed digital content on a customer computer network and/or a remote application service provider. The licensing method is easily tied in to the existing product licensing method employed on the individual customer computer networks thereby giving an individual customer greater flexibility in determining where and when individual digital content in the product suite will be run.

What is claimed is:

1. For use in a customer computer network having at least one node capable of executing digital content from a digital content source on the customer computer network or executing digital content from a digital content source on an application service provider, a licensing method comprising the steps of:
    a. providing licensed units to a customer;
    b. providing independently selectable digital content;
    c. assigning a predetermined number of customer computer network assigned units to each independently selected digital content when the digital content is run on the customer computer network;
    d. assigning a predetermined number of application service provider assigned units to each independently selected digital content when the digital content is run on the application service provider;
    e. charging a number of checked out units to the customer computer network based on the digital content currently being run by the customer on the customer computer network and on the application service provider;
    f. selecting through the customer computer network one of the customer computer network and the application service provider for execution of a selected digital content;
    g. determining a number of available units equal to the difference between the total licensed units to the customer computer network and the total checked out units charged to the customer computer network for digital content currently being executed on the customer computer network and on the application service provider for the customer; and
    h. determining whether a requested digital content is to be executed or denied execution on the selected one of the customer computer network and the application service provider based on the difference between the available units on the customer computer network requesting execution of the digital content and the assigned units of the selected digital content on the selected customer computer network and the application service provider.

2. The method of claim 1 further comprising the steps of:
when the available units on the customer computer network requesting execution of a digital content are greater than or equal to an application service provider required units of the digital content requested by the customer computer network, determining when the application service provider required units of the requested digital content to be executed on the application service provider are to be charged to the available units.

3. The method of claim 1 wherein the application service provider assigned units of at least one of the digital content run on the application service provider differ from the customer computer network assigned units of the identical digital content run on the customer computer network.

4. The method of claim 1 further comprising the steps of:
upon termination of a run of digital content on the application service provider, calculating and adding the application service provider returned units of the terminated digital content to the available units on the customer computer network.

5. The method of claim 1 further comprising the steps of:
requesting execution of one digital content on the application service provider; and
determining if the application service provider can immediately execute the requested digital content.

6. The method of claim 5 further comprising the steps of:
if the application service provider cannot immediately execute the requested product, pre-charging the application service provider assigned units of the requested digital content to the requesting customer computer network; and
queuing the requested digital content for subsequent execution on the application service provider.

7. The method of claim 1 further comprising the step of:
determining whether to charge the application service provider required units at one of the time of the request of execution of the digital content and at the time of execution of the requested digital content on the application service provider.

8. The method of claim 7 further comprising the step of:
when the application service provider required units are to be charged at the time of the request, and the available units are greater than or equal to the application service provider required units of the requested digital content, locking the application service provider required units and charging the application service provider required units to the available units at the requesting customer.

9. The method of claim 8 further comprising the step of:
determining if the application service provider is able to immediately execute the requested digital content.

10. The method of claim 9 wherein:
if the application service provider is not able to immediately execute the requested digital content, waiting for a change in the status of the available units.

11. The method of claim 9 wherein:
when the application service provider is able to immediately execute the requested digital content; and if the available units are greater than the application service provider required units of the requested digital content and the application service provider required units of the requested digital content have been locked, executing the requested digital content.

12. The method of claim 7 wherein if the application service provider required units are to be charged to the available units at the time of execution of the requested digital content, further comprising the step of
at the time of execution, checking if the available units are greater than or equal to the application service provider required units and, if yes, setting the available units equal to the prior available units minus the application service provider required units and, if no, leaving the available units unchanged.

* * * * *